United States Patent
Kwak et al.

(10) Patent No.: US 12,087,296 B2
(45) Date of Patent: Sep. 10, 2024

(54) DISPLAY DEVICE AND ARTIFICIAL INTELLIGENCE SERVER

(71) Applicant: LG ELECTRONICS INC., Seoul (KR)

(72) Inventors: Changmin Kwak, Seoul (KR); Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 17/639,051

(22) PCT Filed: Sep. 19, 2019

(86) PCT No.: PCT/KR2019/012119
§ 371 (c)(1),
(2) Date: Feb. 28, 2022

(87) PCT Pub. No.: WO2021/054495
PCT Pub. Date: Mar. 25, 2021

(65) Prior Publication Data
US 2023/0282209 A1 Sep. 7, 2023

(51) Int. Cl.
*G10L 15/22* (2006.01)
*G10L 15/00* (2013.01)
(Continued)

(52) U.S. Cl.
CPC ............ *G10L 15/22* (2013.01); *G10L 15/005* (2013.01); *G10L 15/1815* (2013.01);
(Continued)

(58) Field of Classification Search
USPC ...................................... 704/1–504
See application file for complete search history.

(56) References Cited

U.S. PATENT DOCUMENTS

| 10,447,966 B2 * | 10/2019 | Ritchey ............. G02B 27/0176 |
| 2005/0177376 A1 * | 8/2005 | Cooper ............... G10L 15/065 |
| | | 704/277 |

(Continued)

FOREIGN PATENT DOCUMENTS

| DE | 112019007646 T5 * | 7/2022 | ............ G10L 15/005 |
| EP | 4037323 A1 * | 8/2022 | ............. G06F 16/78 |

(Continued)

OTHER PUBLICATIONS

International Search Report, issued in PCT/KR2019/012119, PCT/ISA/210, dated Jun. 18, 2020.

*Primary Examiner* — Marcus T Riley
(74) *Attorney, Agent, or Firm* — Birch, Stewart, Kolasch & Birch, LLP

(57) ABSTRACT

A display device according to an embodiment of the present disclosure includes an output unit, a communication unit configured to perform communication with an artificial intelligence server, and a control unit configured to receive a voice command, convert the received voice command into text data, determine whether the converted text data is composed of a plurality of languages, when the text data is composed of the plurality of languages, determine a language for a voice recognition service among the plurality of languages based on the text data, and output an intent analysis result of the voice command in the determined language.

8 Claims, 9 Drawing Sheets

(51) Int. Cl.
*G10L 15/18* (2013.01)
*G10L 15/30* (2013.01)
*H04N 21/422* (2011.01)

(52) U.S. Cl.
CPC ........ *G10L 15/30* (2013.01); *G10L 2015/223* (2013.01); *H04N 21/42203* (2013.01)

(56) References Cited

U.S. PATENT DOCUMENTS

| | | | | |
|---|---|---|---|---|
| 2013/0191122 | A1* | 7/2013 | Mason | G10L 15/26 704/231 |
| 2014/0188486 | A1* | 7/2014 | You | G10L 21/16 704/275 |
| 2017/0206797 | A1* | 7/2017 | Solomon | G06N 3/006 |
| 2018/0240456 | A1 | 8/2018 | Jeong | |
| 2018/0314689 | A1 | 11/2018 | Wang et al. | |
| 2018/0329728 | A1 | 11/2018 | Kim et al. | |
| 2018/0374476 | A1 | 12/2018 | Lee et al. | |
| 2020/0090658 | A1* | 3/2020 | Shin | G10L 15/22 |
| 2020/0092519 | A1* | 3/2020 | Shin | G10L 17/00 |
| 2020/0160837 | A1* | 5/2020 | Jeong | G10L 15/30 |
| 2022/0293099 | A1* | 9/2022 | Lee | G10L 15/22 |
| 2022/0293106 | A1* | 9/2022 | Kim | H04N 21/2665 |
| 2023/0282209 | A1* | 9/2023 | Kwak | G10L 15/32 704/235 |

FOREIGN PATENT DOCUMENTS

| | | | |
|---|---|---|---|
| KR | 10-2018-0096183 A | 8/2018 | |
| KR | 10-1913191 B1 | 10/2018 | |
| KR | 10-2018-0124682 A | 11/2018 | |
| KR | 10-2019-0001434 A | 1/2019 | |
| WO | WO-2021054495 A1 * | 3/2021 | ........... G10L 15/005 |
| WO | WO-2021060575 A1 * | 4/2021 | ............. G06F 16/78 |

* cited by examiner

DISPLAY DEVICE AND ARTIFICIAL INTELLIGENCE SERVER

CROSS REFERENCE TO RELATED APPLICATIONS

This application is the National Phase of PCT/KR2019/012119 filed on Sep. 19, 2019, which is hereby expressly incorporated by reference into the present application.

TECHNICAL FIELD

The present disclosure relates to a display device capable of providing a voice recognition service.

BACKGROUND ART

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

In addition, recent TVs may recognize a voice uttered by a user and provide a voice recognition service that matches the intent of the recognized voice.

However, in the related art, a voice recognition server has been provided by performing intent analysis only through a language preset in a TV.

That is, when a user utters a voice including a plurality of languages, intent analysis is performed only through a preset language. Thus, proper intent analysis is not performed.

DISCLOSURE OF INVENTION

Technical Problem

The present disclosure aims to perform intent analysis and provide a voice recognition service even when a user utters a voice including a plurality of languages.

The present disclosure aims to recognize the languages of a user's voice, regardless of a language preset in a display device, and provide an intent analysis result in a language suitable therefor.

Technical Solution

A display device according to an embodiment of the present disclosure includes an output unit, a communication unit configured to perform communication with an artificial intelligence server, and a control unit configured to receive a voice command, convert the received voice command into text data, determine whether the converted text data is composed of a plurality of languages, when the text data is composed of the plurality of languages, determine a language for a voice recognition service among the plurality of languages based on the text data, and output an intent analysis result of the voice command in the determined language.

An artificial intelligence server according to an embodiment of the present disclosure includes a communication unit configured to perform communication with a display device, and a processor configured to receive voice data from the display device, convert the received voice data into text data, determine whether the converted text data is composed of a plurality of languages, when the text data is composed of the plurality of languages, determine a language for a voice recognition service among the plurality of languages based on the text data, generate an intent analysis result of the voice command in the determined language, and transmit the generated intent analysis result to the display device through the communication unit.

Advantageous Effects

According to an embodiment of the present disclosure, even if a language setting of a display device is set to a specific language, a voice recognition result can be provided in a language uttered by a user.

That is, according to an embodiment of the present disclosure, a language uttered by a user can be recognized, and a service using the recognized language can be provided, thereby providing an improved user experience.

BEST MODE FOR CARRYING OUT THE INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
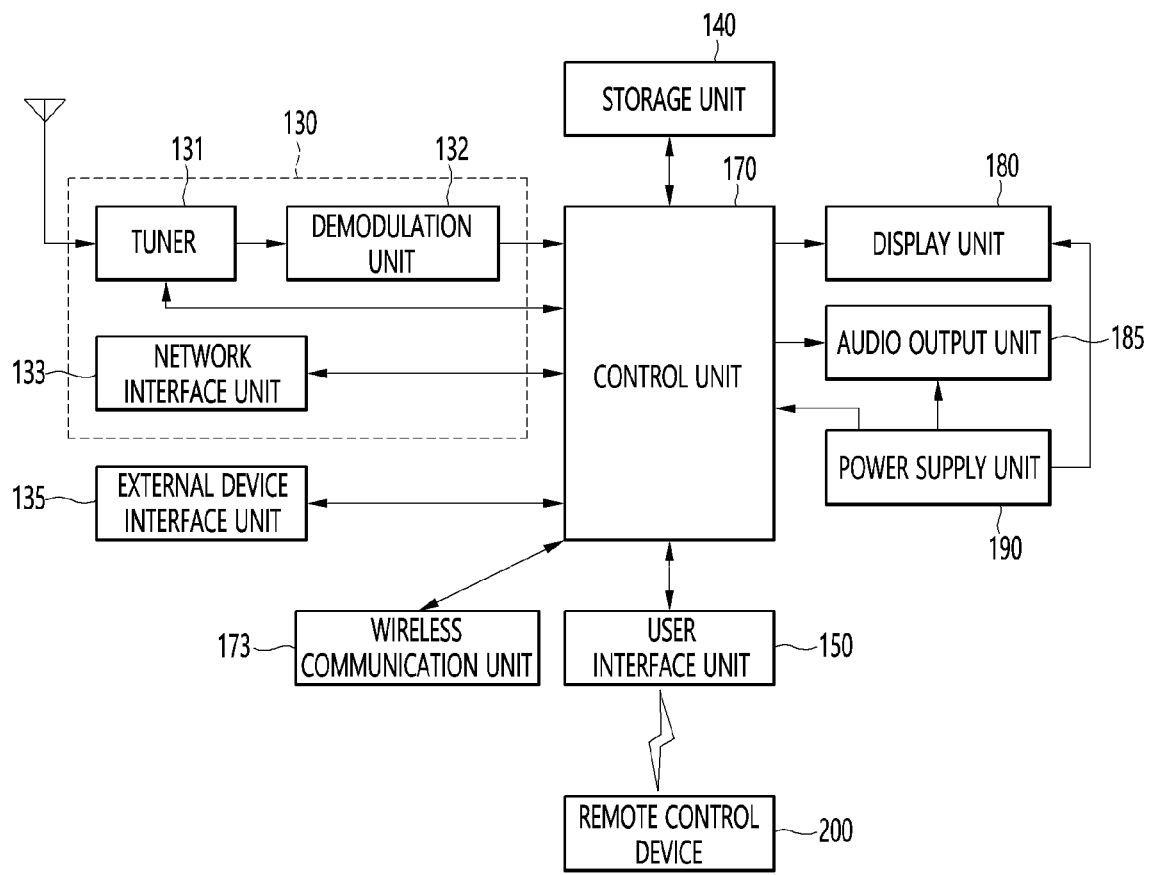
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user input unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program-related data signals, and can restore the divided video signals, audio signals, and data signals into an output available form.

The external device interface unit 135 can receive an application or an application list in an adjacent external device, and can transmit the application or the application list to the control unit 170 or the storage unit 140.

The external device interface unit 135 can provide a connection path between the display device 100 and the external device. The external device interface unit 135 can receive at least one of an image or audio output from the external device that is wirelessly or wiredly connected to the display device 100, and can transmit the image and/or the audio to the control unit 170. The external device interface unit 135 can include a plurality of external input terminals. The plurality of external input terminals can include an RGB terminal, at least one High Definition Multimedia Interface (HDMI) terminal, and a component terminal.

An image signal of the external device input through the external device interface unit 135 can be output through the display unit 180. A voice signal of the external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB memory, and a home theater system, but this is just exemplary.

The network interface unit 133 can provide an interface for connecting the display device 100 to a wired/wireless network including an Internet network. The network interface unit 133 can transmit or receive data to or from another user or another electronic device through an accessed network or another network linked to the accessed network.

In addition, some content data stored in the display device 100 can be transmitted to a user or an electronic device, which is selected from users other or other electronic devices preregistered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

The network interface unit 133 can receive content or data provided from a content provider or a network operator. That is, the network interface unit 133 can receive content, such as movies, advertisements, games, VODs, and broadcast signals, which are provided from the content provider or the network operator, and information relating thereto through the network.

In addition, the network interface unit 133 can receive firmware update information and update files provided from the network operator, and can transmit data to the Internet or content provider or the network operator.

The network interface unit 133 can select and receive a desired application among applications open to the air, through the network.

The storage unit 140 can store signal-processed image, voice, or data signals stored by a program in order for each signal processing and control in the control unit 170.

In addition, the storage unit 140 can perform a function for temporarily storing image, voice, or data signals output from the external device interface unit 135 or the network interface unit 133, and can store information on a predetermined image through a channel memory function.

The storage unit 140 can store an application or an application list input from the external device interface unit 135 or the network interface unit 133.

The display device 100 can play content files (e.g., video files, still image files, music files, document files, application files, etc.) stored in the storage unit 140, and can provide the content files to a user.

The user input unit 150 can transmit signals input by a user to the control unit 170, or can transmit signals from the control unit 170 to a user. For example, the user input unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 can transmit, to the control unit 170, control signals input from local keys (not shown) such as a power key, a channel key, a volume key, and a setting key.

Image signals that are image-processed by the control unit 170 can be input to the display unit 180 and displayed as images corresponding to the image signals. In addition, image signals that are image-processed by the control unit 170 can be input to an external output device through the external device interface unit 135.

Voice signals processed by the control unit 170 can be output to the audio output unit 185. In addition, voice signals processed by the control unit 170 can be input to the external output device through the external device interface unit 135.

Additionally, the control unit 170 can control overall operations of the display device 100.

In addition, the control unit 170 can control the display device 100 by a user command or an internal program input through the user input unit 150, and can access the network to download a desired application or application list into the display device 100.

The control unit 170 can output channel information selected by a user together with the processed image or voice signals through the display unit 180 or the audio output unit 185.

In addition, the control unit 170 can output image signals or voice signals of an external device such as a camera or a camcorder, which are input through the external device interface unit 135, through the display unit 180 or the audio output unit 185, according to an external device image playback command received through the user input unit 150.

Moreover, the control unit 170 can control the display unit 180 to display images, and can control the display unit 180 to display broadcast images input through the tuner 131, external input images input through the external device interface unit 135, images input through the network interface unit, or images stored in the storage unit 140. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform wired or wireless communication with an external device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a wearable device capable of communication around the display device 100. Furthermore, if the detected wearable device is a device authenticated to communicate with the display device 100, the control unit 170 can transmit at least part of data processed in the display device 100 to the wearable device through the wireless communication unit 173. Therefore, a user of the wearable device can use the data processed by the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing content input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

A remote control device according to an embodiment of the present disclosure will be described with reference to FIGS. 2 and 3.

Figure 2:
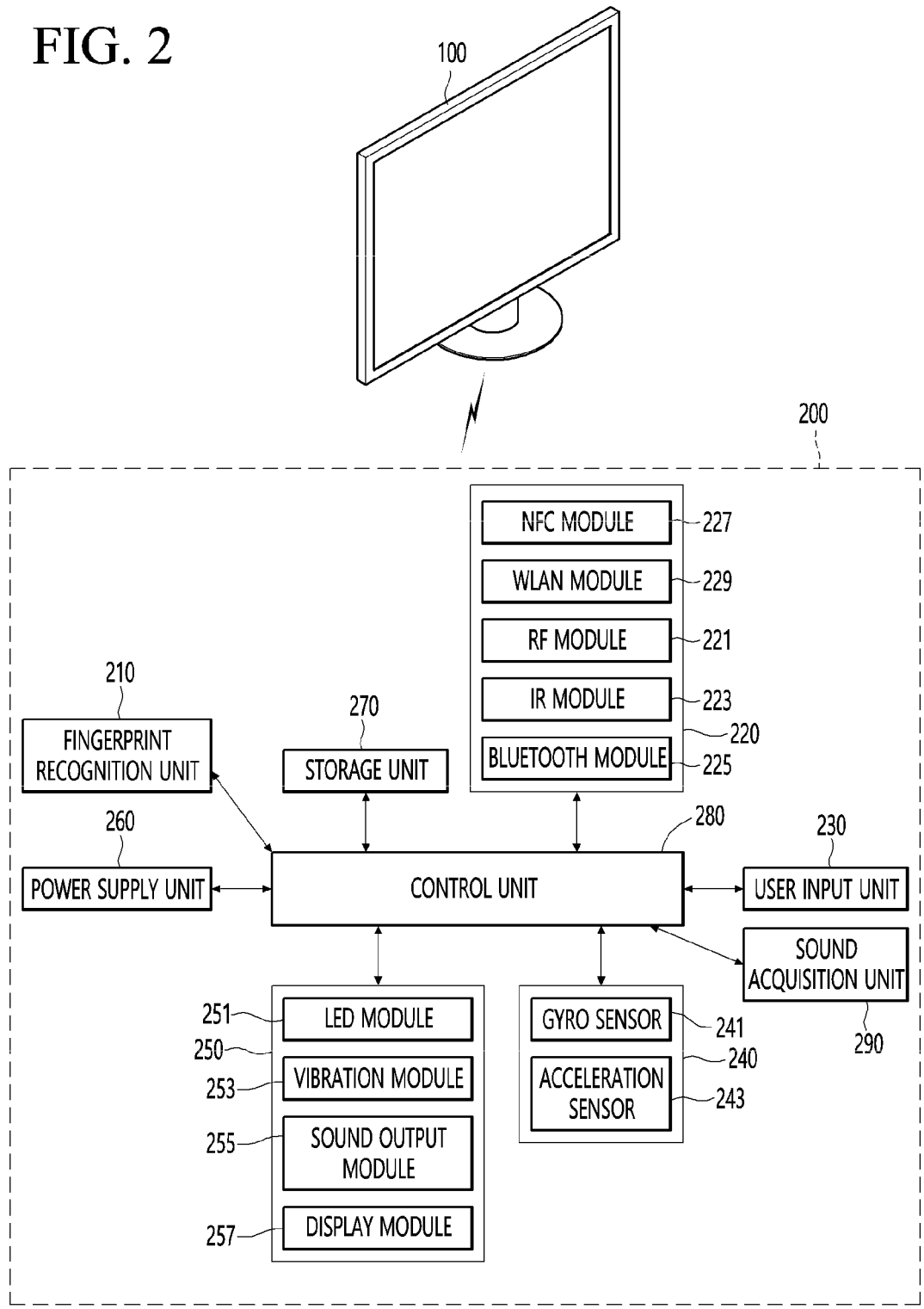
FIG. 2 is a block diagram illustrating a remote control device according to an embodiment of the present disclosure.
Figure 3:
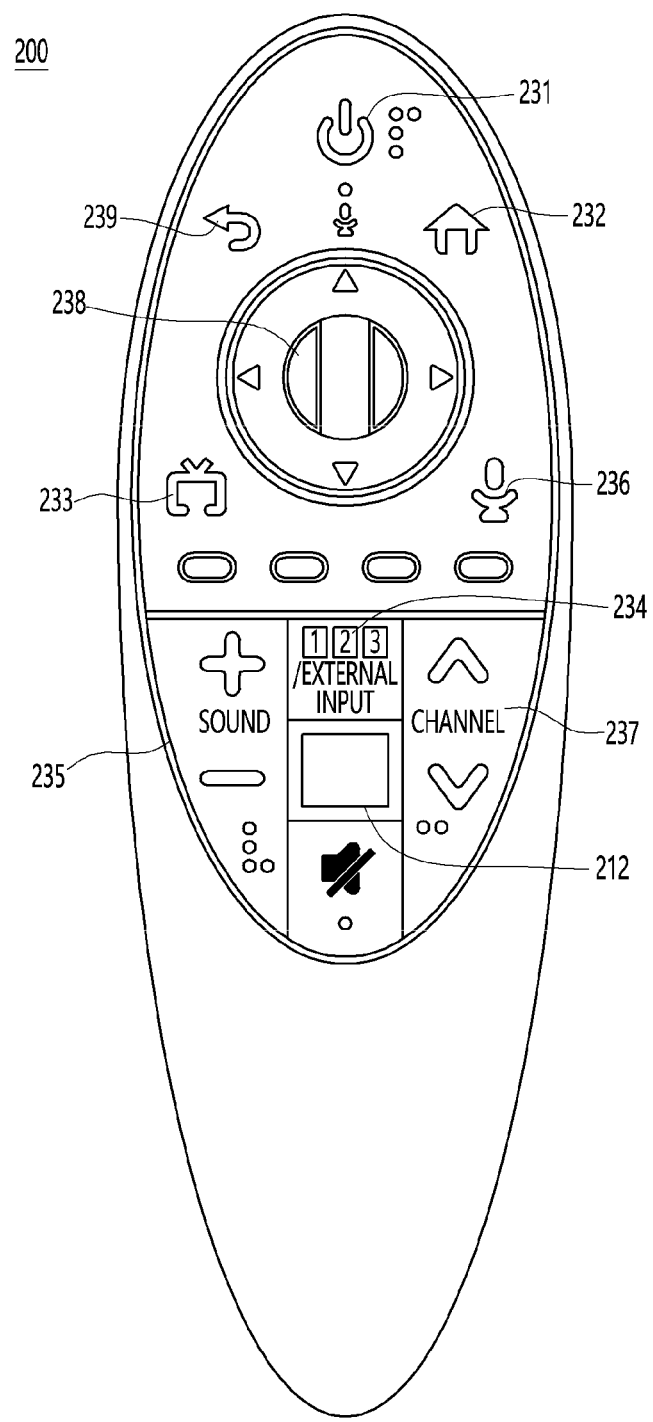
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 225, a user input unit 230, a sensor unit 240, an output unit 250, a power supply unit 260, a storage unit 270, a control unit 280, and a sound acquisition unit 290.

Referring to FIG. 2, the wireless communication unit 225 transmits/receives signals to/from an arbitrary any one of display devices according to the above-mentioned embodiments of the present disclosure.

The remote control device 200 can include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 can include a Bluetooth module 225 capable of transmitting or receiving signals to or from the display device 100 according to a Bluetooth communication standard. In addition, the remote control device 200 can include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 can transmit signals containing information on the movement of the remote control device 200 to the display device 100 through the wireless communication unit 220.

Moreover, the remote control device 200 can receive signals transmitted from the display device 100 through the RF module 221 and if necessary, can transmit a command for power on/off, channel change, and volume change to the display device 100 through the IR module 223.

The user input unit 230 can be configured with a keypad, a button, a touch pad, or a touch screen. A user can operate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be a button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The volume control button 235 can be a button for controlling a volume output from the display device 100. The voice recognition button 236 can be a button for receiving user's voice and recognizing the received voice. The channel change button 237 can be a button for receiving broadcast signals of a specific broadcast channel. The OK button 238 can be a button for selecting a specific function, and the back button 239 can be a button for returning to a previous screen.

FIG. 2 is described again.

If the user input unit 230 includes a touch screen, a user can touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 can include a gyro sensor 241 or an acceleration sensor 243. The gyro sensor 241 can sense information on the movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor that senses a distance with respect to the display unit 180 of the display device 100.

The output unit 250 can output image or voice signals in response to the operation of the user input unit 235, or can output image or voice signals corresponding to signals transmitted from the display device 100. A user can recognize whether the user input unit 235 is operated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the supply of power if a predetermined key provided at the remote control device 200 is operated.

The storage unit 270 can store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to the control of the remote control device 200. The control unit 280 can transmit a signal corresponding to a predetermined key operation of the user input unit 235 or a signal corresponding to the movement of the remote control device 200 sensed by the sensor unit 240 to the display device 100 through the wireless communication unit 225.

In addition, the sound acquisition unit 290 of the remote control device 200 can acquire voice.

The sound acquisition unit 290 can include at least one microphone and acquire voice through the microphone.

Figure 4:
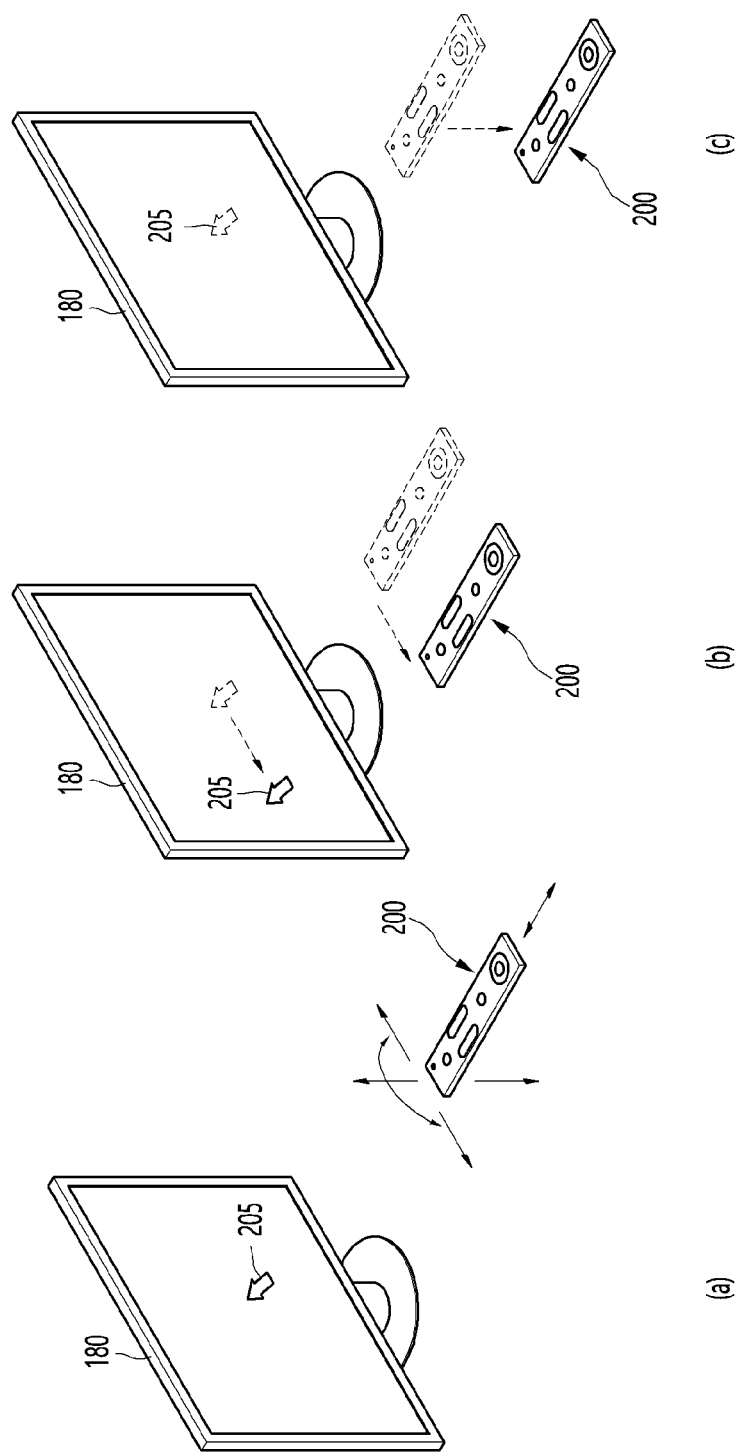
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 can be zoomed in and displayed in an enlarged size.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
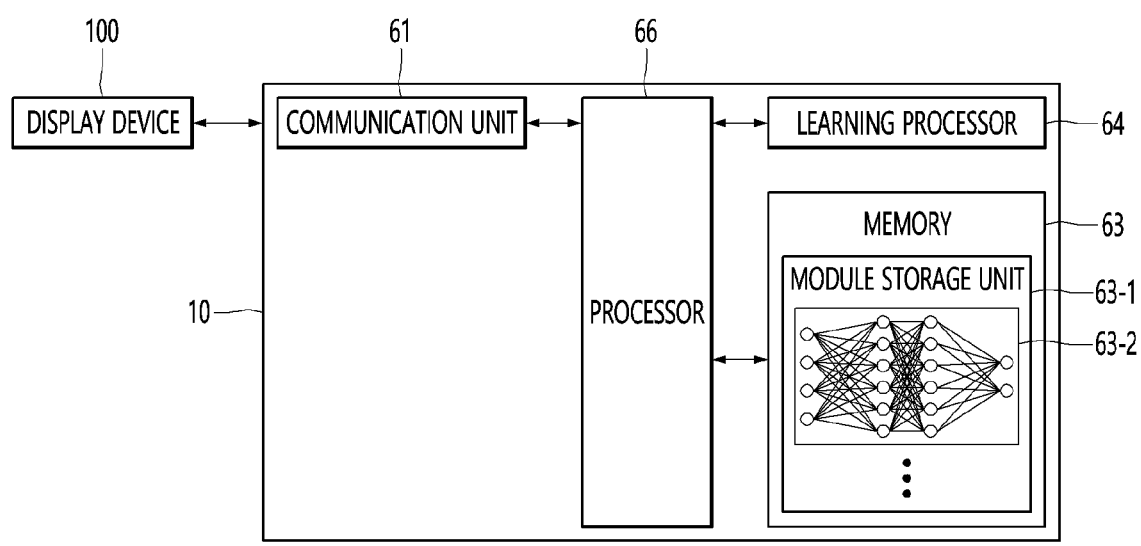
FIG. 5 is a block diagram for describing a configuration of an artificial intelligence (AI) server according to an embodiment of the present disclosure.

FIG. 5 is a block diagram for describing a configuration of an artificial intelligence (AI) server according to an embodiment of the present disclosure.

Referring to FIG. 5, the AI server 10 can refer to a device that learns an artificial neural network by using a machine learning algorithm or uses a learned artificial neural network.

The AI server 10 can be configured with a plurality of servers to perform distributed processing, and can be defined as a 5G network. In this case, the AI server 10 can be included as a part of the display device 100 to perform at least a part of AI processing together.

The AI server 10 can include a communication unit 61, a memory 63, a learning processor 64, and a processor 66.

The communication unit 61 can transmit or receive data to or from an external device such as the display device 100.

The memory 63 can include a model storage unit 63-1. The model storage unit 63-1 can store a model (or an artificial neural network 63-2) that is being learned or is learned through the learning processor 64.

The learning processor 64 can learn the artificial neural network 63-2 by using training data. The learning model can be used while being mounted on the AI server 10 of the artificial neural network, or can be used while being mounted on the external device such as the display device 100.

The learning model can be implemented as hardware, software, or a combination of hardware and software. When all or part of the learning model is implemented as software, one or more instructions constituting the learning model can be stored in the memory 63.

The processor 66 can infer a result value for new input data by using the learning model and generate a response or a control command based on the inferred result value.

Figure 6:
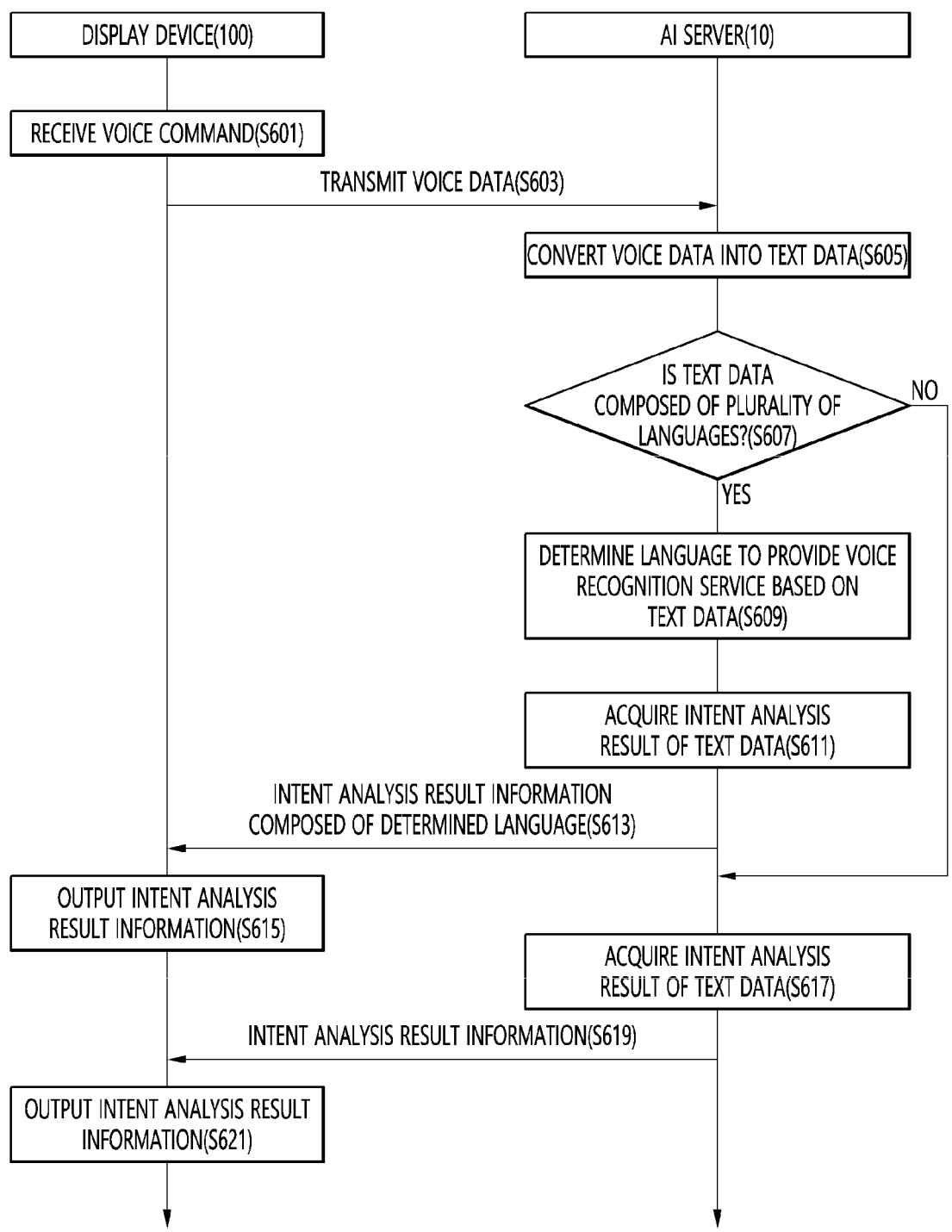
FIG. 6 is a ladder diagram for describing an operating method of a voice recognition system according to an embodiment of the present disclosure.

FIG. 6 is a ladder diagram for describing an operating method of a voice recognition system according to an embodiment of the present disclosure.

The voice recognition system may include the display device 100 and the AI server 10.

The control unit 170 of the display device 100 receives a voice command uttered by a user (S601).

As another example, the control unit 170 can receive a voice command through a microphone (not shown) provided in the display device 100.

As another example, the control unit 170 can receive, from the remote control device 200, the voice command received by the remote control device 200.

The control unit 170 of the display device 100 transmits voice data corresponding to the received voice command to the AI server 10 through the network interface unit 133 (S603).

The control unit 170 can convert a voice signal corresponding to the received voice command into voice data. The control unit 170 can generate voice data by removing a noise signal from the voice signal.

The processor 66 of the AI server 10 converts the received voice data into text data (S605).

The processor 66 can convert the voice data into text data by using a speech to text (STT) engine.

The processor 66 of the AI server 10 determines whether the converted text data includes a plurality of languages (S607).

The processor 66 can determine whether the text data includes a plurality of languages by using analysis results of a plurality of language analyzers.

The processor 66 can include a language analyzers.

Each of the language analyzers can recognize and a part-of-speech of a language and a named entity corresponding to each language analyzer from the text data. The named entity can indicate a word or phrase having a specific meaning within a sentence.

The processor 66 can identify one or more languages constituting the text data by using the named entity and the part-of-speech of the named entity included in the text data.

When the processor 66 of the AI server 10 determines that the converted text data includes the plurality of languages, the processor 66 of the AI server 10 determines the language to provide the voice recognition service among the plurality of languages based on the text data (S609).

When the processor 66 determines that the text data includes two or more languages, the processor 66 can determine the language of the voice recognition service to be provided among the two or more languages in response to the voice command, based on the text data.

For example, the processor 66 can determine the language based on the number of words constituting the text data including the two or more languages.

For example, when the text data includes four English words and three Korean words, the processor 66 can determine the language corresponding to the most words among the plurality of languages as the language to provide the voice recognition service.

As another example, the processor 66 can determine the language based on the part-of-speech of the text data. For example, if the text data includes two languages like <How is the weather in 서울 (Seoul in English)?>, the processor 66 can determine the language of the remaining words except for <서울>, which is a proper noun, as the language to provide the voice recognition service.

The processor 66 of the AI server 10 acquires an intent analysis result of the text data (S611), and transmits intent analysis result information including the determined language to the display device 100 through the communication unit 61 (S613).

The processor 66 can analyze the intent of the text data by using a natural language processing (NLP) engine.

For example, when the text data is <How is the weather in 서울 ?>, the processor 66 can determine the intent of the voice command uttered by the user as the intent to request the weather information of Seoul.

The intent analysis result information can be information including service information according to the intent of the voice command.

For example, when the intent of the voice command is to request weather information of Seoul, the processor 66 can request weather information of Seoul from a weather server, and receive weather information from the weather server. In this case, the intent analysis result information can be weather information of Seoul.

The processor 66 can convert the words constituting the intent analysis result information into the determined language. For example, when the words constituting the intent analysis result information are Korean and the determined language is English, the processor 66 can convert Korean words constituting the intent analysis result information into English words.

The processor 66 can transmit the intent analysis result information configured in the determined language to the display device 100.

The control unit 170 of the display device 100 outputs the intent analysis result information received from the AI server 10 (S615).

The control unit 170 can display the intent analysis result information configured in a specific language through the display unit 180.

As another example, the control unit 170 can output the intent analysis result information configured in a specific language through the audio output unit 185.

On the other hand, when the processor 66 of the AI server 10 determines that the text data includes one language (S607), the processor 66 of the AI server 10 acquires the intent analysis result of the text data (S617), and transmits the intent analysis result in the corresponding language to the display device 100 (S619).

The control unit 170 of the display device 100 outputs the intent analysis result information received from the AI server 10 (S621).

Figure 7:
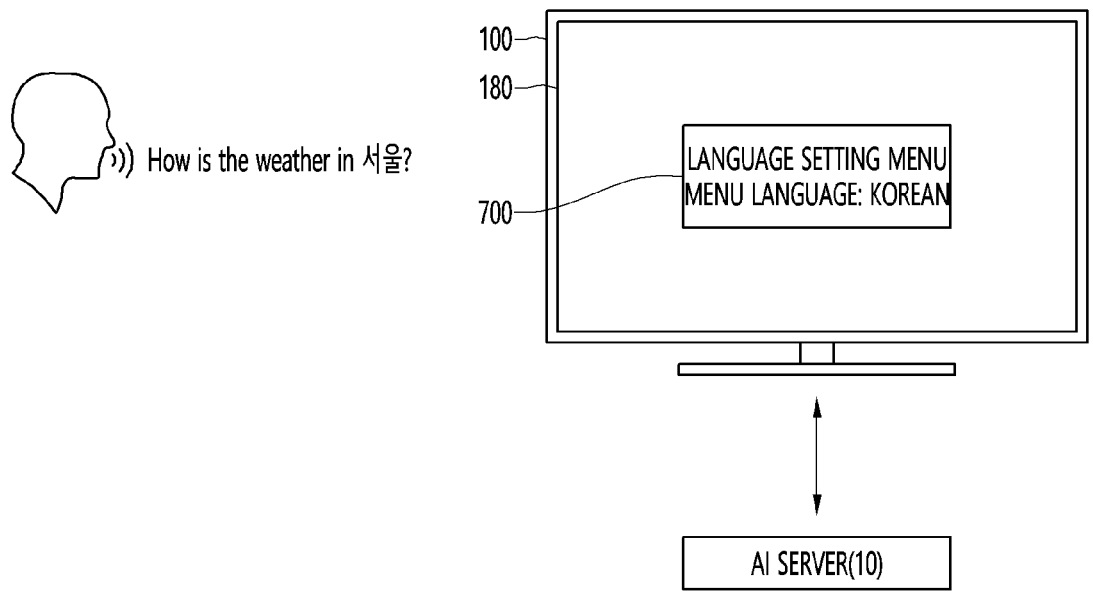
FIGS. 7 and 8 are views for describing an example of, if a set language is different from a language according to a text data analysis, determining one language and providing intent analysis result information in the determined language, according to an embodiment of the present disclosure.
Figure 8:
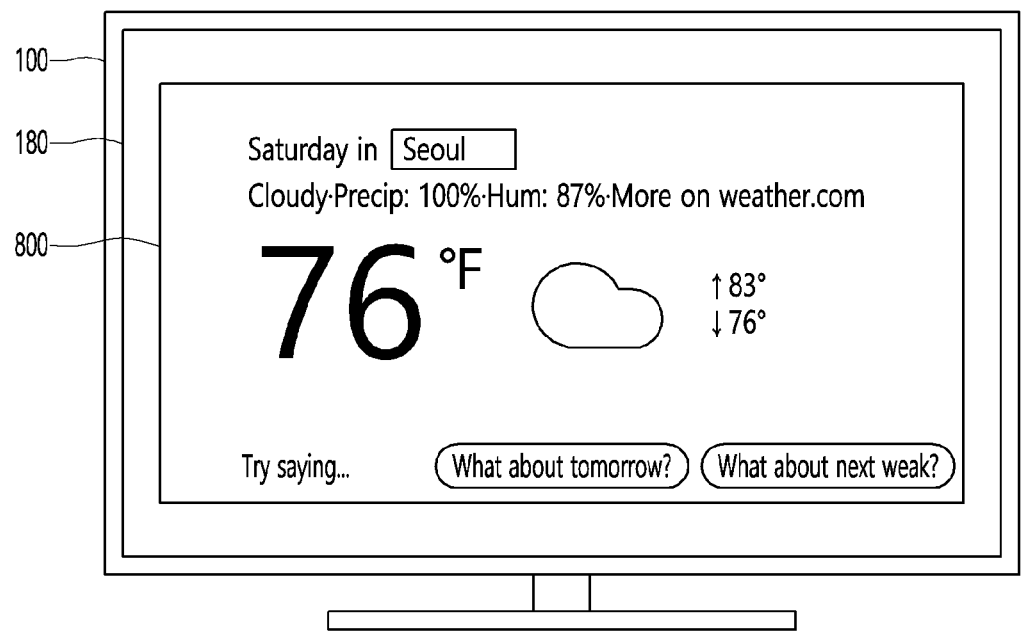

FIGS. 7 and 8 are views for describing an example of, if a set language is different from a language according to a text data analysis, determining one language and providing intent analysis result information in the determined language, according to an embodiment of the present disclosure.

In FIGS. 7 and 8, it is assumed that the display device 100 is set to provide a voice recognition service in Korean through a language setting menu 700.

The display device 100 can receive <How is the weather in 서울 ?>, which is the voice command uttered by the user.

The display device 100 can transmit voice data of the voice command to the AI server 10.

The AI server 10 can convert the voice data into text data and determine whether the text data includes a plurality of languages.

The AI server 10 can determine that <How is the weather in 서울 ?> is configured in English and Korean.

The AI server 10 can determine the language to provide the voice recognition service among English and Korean.

The AI server 10 can determine English as the language for the voice recognition service because five words out of six words are English.

When the number of English words and Korean words constituting the text data is the same, the AI server 10 can determine the preset language as the language for the voice recognition service through the language setting menu 700 of the display device 100.

The AI server 10 can analyze the intent of the text data through the NLP engine, and can acquire intent analysis result information. The AI server 10 can determine that the user's utterance intent is a request for weather information of Seoul, and can acquire weather information of Seoul.

The AI server 10 can generate weather information of Seoul in the determined language and transmit the generated weather information of Seoul to the display device 100.

As shown in FIG. 8, the display device 100 can display the weather information 800 of Seoul in English through the display unit 180.

As such, according to an embodiment of the present disclosure, even if the language setting of the display device is set to Korean, the voice recognition result can be provided in the language uttered by the user.

That is, according to an embodiment of the present disclosure, the language uttered by the user can be recognized, and the service using the recognized language can be provided, thereby providing an improved user experience.

Figure 9:
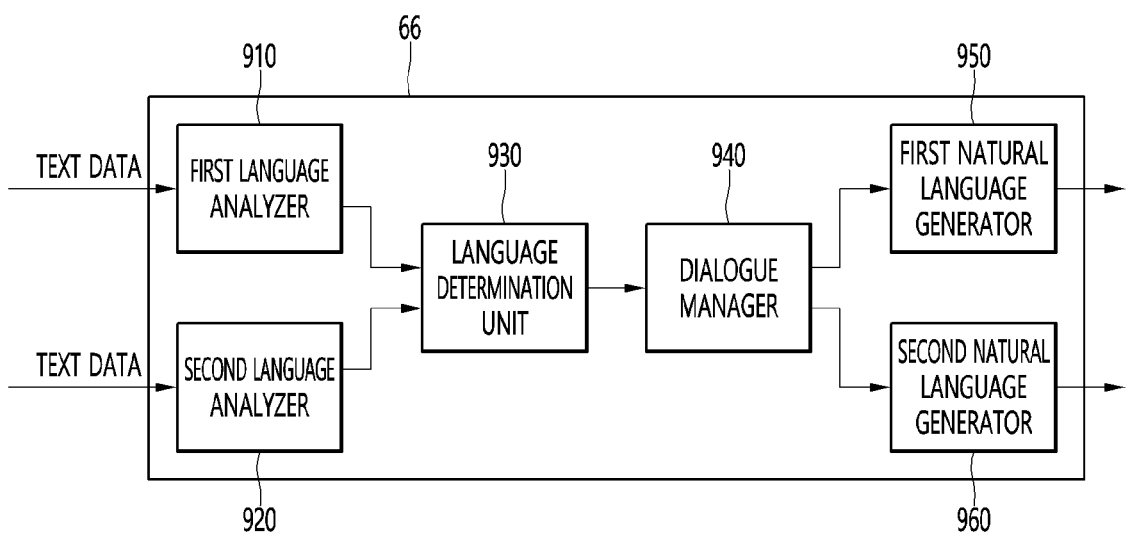
FIG. 9 is a view for describing a detailed configuration of a processor of an AI server according to an embodiment of the present disclosure.

FIG. 9 is a view for describing a detailed configuration of the processor of the AI server according to an embodiment of the present disclosure.

Referring to FIG. 9, the processor 66 of the AI server 10 can include a first language analyzer 910, a second language analyzer 920, a language determination unit 930, a dialog manager 940, a first natural language generator 950, and a second natural language generator 960.

The first language analyzer 910 can recognize a named entity of a first language and a part-of-speech of the named entity from text data.

The second language analyzer 920 can recognize a named entity of a second language and a part-of-speech of the named entity from the text data.

The language determination unit 930 can determine a language for a voice recognition service among the first language and the second language based on recognition results of the first language analyzer 910 and the second language analyzer 920.

The language determination unit 930 can determine of which language each of the words constituting the text data is composed, and can determine a specific language as the language for the voice recognition service when the words of the specific language are the most.

When one of the first language and the second language is not determined, the language determination unit 930 can determine a language preset in the display device 100 as the language for the voice recognition service.

The dialog manager 940 can analyze the intent of the text data in the determined language. The dialog manager 940 can serve as an NLP engine.

The first natural language generator 950 can convert the text for the intent analysis result into the first language and generate intent analysis result information.

The second natural language generator 960 can convert the text for the intent analysis result into the second language and generate intent analysis result information.

On the other hand, the components of FIG. 9 can also be included in the control unit 170 of the display device 100. That is, the control unit 170 can include the first language analyzer 910, the second language analyzer 920, the language determination unit 930, the dialog manager 940, the first natural language generator 950, and the second natural language generator 960.

Figure 10:
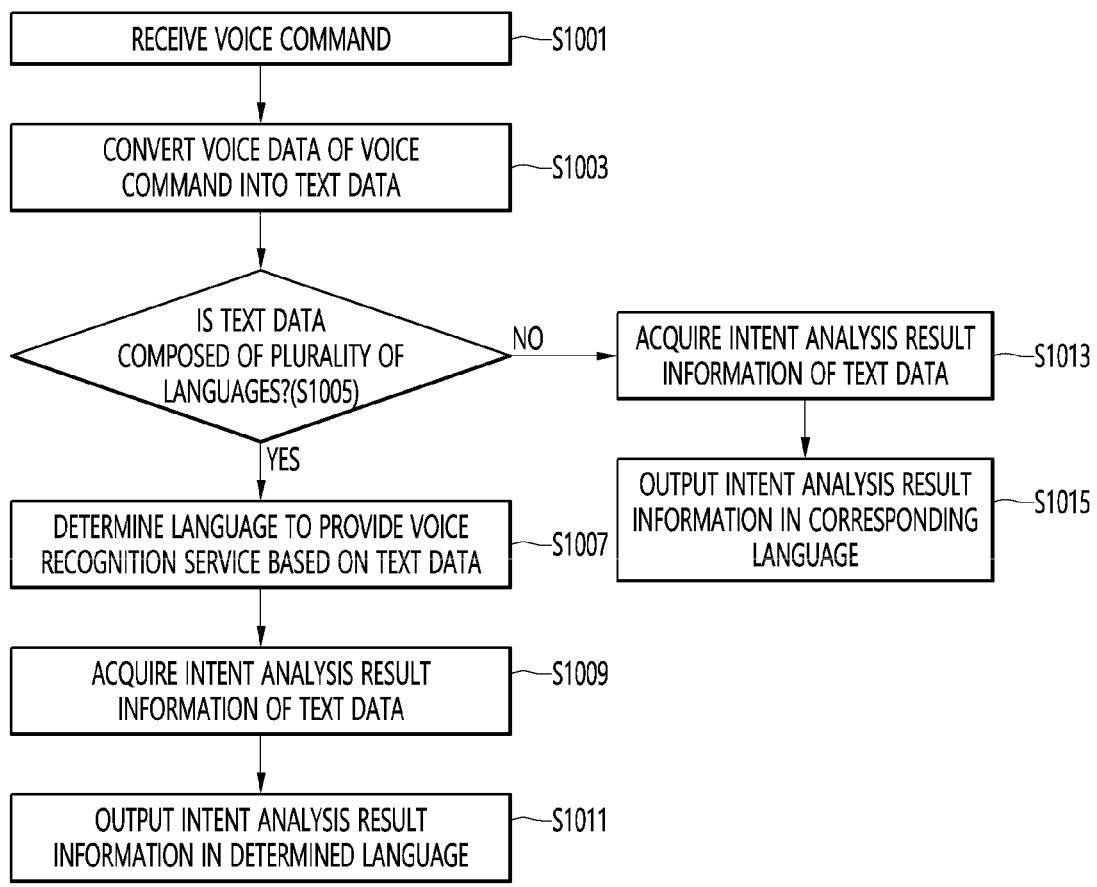
FIG. 10 is a flowchart for describing an operating method of a display device according to an embodiment of the present disclosure.

FIG. 10 is a flowchart for describing the operating method of the display device according to an embodiment of the present disclosure.

In particular, FIG. 10 is a view based on an embodiment in which the display device 100 directly determines the language for the voice recognition service from the text data.

Hereinafter, the control unit 170 can be referred to as a controller or a processor.

The control unit 170 of the display device 100 receives a voice command uttered by a user (S1001).

The control unit 170 of the display device 100 converts voice data of the received voice command into text data (S1003).

The control unit 170 can convert the voice data into text data by using an STT engine.

The control unit 170 of the display device 100 determines whether the converted text data is composed of a plurality of languages (S1005).

The control unit 170 can determine whether the text data is composed of a plurality of languages by using analysis results of a plurality of language analyzers.

The control unit 170 can include a plurality of language analyzers.

Each of the language analyzers can recognize a named entity and a part-of-speech of the named entity from the text data. The named entity can indicate a word or phrase having a specific meaning within a sentence.

The control unit 170 can identify one or more languages constituting the text data by using the named entity and the part-of-speech of the named entity included in the text data.

When the control unit 170 of the display device 100 determines that the converted text data is composed of the plurality of languages, the control unit 170 of the display device 100 determines the language to provide the voice recognition service among the plurality of languages based on the text data (S1007).

When the control unit 170 determines that the text data is composed of two or more languages, the control unit 170 can determine the language of the voice recognition service to be provided among the two or more languages in response to the voice command, based on the text data.

For example, the control unit 170 can determine the language based on the number of words constituting the text data composed of the two or more languages.

For example, when the text data is composed of four English words and three Korean words, the control unit 170 can determine the language corresponding to the most words among the plurality of languages as the language to provide the voice recognition service.

The control unit 170 of the display device 100 acquires intent analysis result information indicating the intent analysis result of the text data (S1009), and outputs the intent analysis result information composed of the determined language (S1011).

The control unit 170 can analyze the intent of the text data by using an NLP engine.

For example, when the text data is <How is the weather in 서울 ?>, the control unit 170 can determine the intent of the voice command uttered by the user as the intent to request the weather information of Seoul.

The intent analysis result information can be information including service information according to the intent of the voice command.

On the other hand, when the control unit 170 of the display device 100 determines that the text data is composed of one language (S1005), the control unit 170 of the display device 100 acquires the intent analysis result of the text data (S1013), and transmits the intent analysis result in the corresponding language (S1015).

According to an embodiment of the present disclosure, the above-described method can be implemented with codes readable by a processor on a medium in which a program is recorded. Examples of the medium readable by the processor include a ROM, a RAM, a CD-ROM, a magnetic tape, a floppy disk, an optical data storage device, and the like, and can include those implemented in the form of carrier wave (for example, transmission over Internet).

The display device described above is not limitedly applicable to the configuration and method of the above-described embodiments, and the embodiments are configured by selectively combining all or part of each of the embodiments such that various modifications can be made.

The invention claimed is:

1. A display apparatus comprising:
an output unit;
a communication circuitry configured to perform communication with an artificial intelligence server; and
a control device configured to:
receive a voice command;
convert the received voice command into text data;
determine whether the converted text data is composed of a plurality of languages;
when the text data is composed of the plurality of languages, determine a language for a voice recognition service among the plurality of languages based on the text data; and
output an intent analysis result of the voice command in the determined language,
wherein the control device includes a plurality of language analyzers, and
wherein the control device is configured to determine a specific language as a language for the voice recognition service when a number of words of the specific language among words constituting the text data is largest, based on recognition results of the plurality of language analyzers.

2. The display apparatus of claim 1, wherein each of the plurality of language analyzers is configured to recognize a named entity and a part-of-speech of the named entity from the text data.

3. The display apparatus of claim 2, wherein, when a first language is set as the language for the voice recognition service and the determined language is a second language, the control device is configured to output the intent analysis result in the second language.

4. The display apparatus of claim 1, wherein the output unit includes a display device configured to display the intent analysis result or an audio output device configured to output the intent analysis result as audio.

5. An artificial intelligence server comprising:
a communication circuitry configured to perform communication with a display device; and
a processor circuitry configured to:
receive voice data from the display device;
convert the received voice data into text data;
determine whether the converted text data is composed of a plurality of languages;

when the text data is composed of the plurality of languages, determine a language for a voice recognition service among the plurality of languages based on the text data;

generate an intent analysis result of a voice command in the determined language; and transmit the generated intent analysis result to the display device through the communication unit, wherein the processor circuitry includes a plurality of language analyzers, and wherein the processor circuitry is configured to determine a specific language as a language for the voice recognition service when a number of words of the specific language among words constituting the text data is largest, based on recognition results of the plurality of language analyzers.

6. The artificial intelligence server of claim 5, wherein each of the plurality of language analyzers is configured to recognize a named entity and a part-of-speech of the named entity from the text data.

7. The artificial intelligence server of claim 6, wherein, when a first language is set as the language for the voice recognition service in the display device and the determined language is a second language, the processor circuitry is configured to generate the intent analysis result in the second language.

8. The artificial intelligence server of claim 1, wherein the processor circuitry is configured to use a natural language processing engine to acquire the intent analysis result of the text data.

* * * * *